(12) United States Patent
Chen et al.

(10) Patent No.: US 11,248,773 B2
(45) Date of Patent: Feb. 15, 2022

(54) LIGHT SOURCE SYSTEM AND LIGHTING APPARATUS

(71) Applicant: YLX Incorporated, Shenzhen (CN)

(72) Inventors: Bin Chen, Shenzhen (CN); Fei Hu, Shenzhen (CN); Zuqiang Guo, Shenzhen (CN); Yi Li, Shenzhen (CN)

(73) Assignee: YLX Incorporated, Shenzhen (CN)

( * ) Notice: Subject to any disclaimer, the term of this patent is extended or adjusted under 35 U.S.C. 154(b) by 0 days.

(21) Appl. No.: 16/756,977

(22) PCT Filed: Jan. 4, 2018

(86) PCT No.: PCT/CN2018/071417
§ 371 (c)(1),
(2) Date: Apr. 17, 2020

(87) PCT Pub. No.: WO2019/075935
PCT Pub. Date: Apr. 25, 2019

(65) Prior Publication Data
US 2021/0131642 A1  May 6, 2021

(30) Foreign Application Priority Data

Oct. 18, 2017  (CN) .......................... 201710972375.8

(51) Int. Cl.
*F21V 9/30* (2018.01)
*F21V 9/40* (2018.01)
(Continued)

(52) U.S. Cl.
CPC ................... *F21V 9/30* (2018.02); *F21V 3/00* (2013.01); *F21V 5/04* (2013.01); *F21V 9/40* (2018.02);
(Continued)

(58) Field of Classification Search
CPC .............. G02B 27/1006; G02B 27/141; G02B 27/1086; F21V 9/30; F21V 9/40
See application file for complete search history.

(56) References Cited

U.S. PATENT DOCUMENTS

| | | | | |
|---|---|---|---|---|
| 8,573,779 | B2* | 11/2013 | Yamagishi | G03B 21/2013 353/33 |
| 2015/0153009 | A1* | 6/2015 | He | H01L 33/508 362/84 |

(Continued)

FOREIGN PATENT DOCUMENTS

| | | |
|---|---|---|
| CN | 201307187 Y | 9/2009 |
| CN | 101771108 A | 7/2010 |

(Continued)

OTHER PUBLICATIONS

Machine translation of Huang et al., CN 106385739A, Feb. 8, 2017 (Year: 2017).*

(Continued)

*Primary Examiner* — William N Harris
(74) *Attorney, Agent, or Firm* — The Dobrusin Law Firm, PC

(57) ABSTRACT

A light source system and a lighting apparatus comprising: a light-emitting module which emits first light along a first light path and second light along a second light path; a wavelength conversion device which received the first light to emit excited light with a different color from that of the first light; and a compensation device which guides the second light and adjusts a luminous intensity distribution of the second light so that the luminous intensity distribution of the second light exiting from the compensation device is substantially identical to that of the excited light. The second light exiting from the compensation device is combined with the excited light to form third light to be emitted from the light source system. The luminous intensity distributions of the first light and the second light in the third light are substantially the same, and illumination light spots have a uniform color.

18 Claims, 4 Drawing Sheets

(51) Int. Cl.
   *F21V 3/00*      (2015.01)
   *F21V 5/04*      (2006.01)
   *G02B 27/09*     (2006.01)
   *F21W 131/406*   (2006.01)

(52) U.S. Cl.
   CPC ... *G02B 27/0927* (2013.01); *F21W 2131/406* (2013.01)

(56) References Cited

U.S. PATENT DOCUMENTS

| | | | | |
|---|---|---|---|---|
| 2015/0362830 | A1* | 12/2015 | Liao | G03B 21/204 |
| | | | | 353/31 |
| 2016/0062221 | A1* | 3/2016 | Matsubara | G02B 19/0057 |
| | | | | 353/31 |
| 2016/0131315 | A1* | 5/2016 | Zhang | F21V 9/08 |
| | | | | 362/231 |

FOREIGN PATENT DOCUMENTS

| | | |
|---|---|---|
| CN | 203258507 U | 10/2013 |
| CN | 103486451 A | 1/2014 |
| CN | 103913936 A | 7/2014 |
| CN | 203217230 U | 3/2015 |
| CN | 105122133 A | 12/2015 |
| CN | 205644002 U | 10/2016 |
| CN | 106195929 A | 12/2016 |
| CN | 106385739 A | 2/2017 |
| CN | 104460008 A | 7/2017 |
| JP | 2010225791 A | 10/2010 |

OTHER PUBLICATIONS

Chinese First Office Action, Application No. 201710972375.8.
Chinese Second Office Action, Application No. 201710972375.8.
Chinese First Search, Application No. 201710972375.8; dated May 21, 2021.
Chinese Supplementary Search Office Action, Application No. 201710972375,8; dated May 21, 2021.

* cited by examiner

LIGHT SOURCE SYSTEM AND LIGHTING APPARATUS

TECHNICAL FIELD

The present disclosure relates to the field of lighting technology, and in particular to a light source system and a lighting apparatus thereof.

BACKGROUND

This section is intended to provide a background or context for specific embodiments of the present disclosure as set forth in the claims. The description here is not admitted to be prior art although it is included in this section.

With the increasing demand for brightness of special lighting apparatuses such as stage lights, an integrated LED lighting source encounters a bottleneck and cannot be maintained at an acceptable volume size together with an increased total brightness of lamps. Therefore, some research and development personnel have turned to other technical solutions to solve a compatibility problem between a brightness and a volume of the light source. In particular, the application of a technology, in which a laser is used to excite a long-range fluorescent body, is receiving more and more attention in such lighting apparatus.

Generally, by directing a laser light beam being excitation light to a wavelength conversion device, a part of the excitation light is absorbed by a wavelength conversion material to emit excited light, and the excited light is emitted together with the remaining unabsorbed excitation light to form an emergent light beam of the lighting apparatus.

A wavelength conversion material is uniformly distributed on the wavelength conversion device on a light path where the excited light is generated. Since a luminous intensity of the laser light is in a Gaussian distribution, the luminous intensity near a center of a light spot is relatively large, and an excitation light-excited light conversion efficiency of the wavelength conversion material at this position is low due to being affected by factors such as thermal effects; and on the other hand, a luminous intensity of the laser light at an edge is low, and the excitation light-excited light conversion efficiency of the wavelength conversion material is high. This results in different proportions of a luminous intensity distribution of excited light that has been excited and a luminous intensity distribution of the incident excitation light, leading to non-uniformity in color mixing in different regions and even an obvious color deviation between a center and an edge of a region where light is finally emitted.

SUMMARY

In order to solve the technical problem of color non-uniformity of the light spot of the stage lights in the related art, the present disclosure provides a light source system, including: a light-emitting module configured to emit first light along a first light path and second light along a second light path; a wavelength conversion device configured to receive the first light and emit excited light with a color different from that of the first light; and a compensation device configured to guide the second light and adjust a luminous intensity distribution of the second light so that the second light exiting from the compensation device is substantially identical to that of the excited light. The second light exiting from the compensation device is combined with the excited light to form third light to be emitted from the light source system.

The present disclosure further provides a lighting apparatus, including the light source system described above.

The light source system and the lighting apparatus provided by the present disclosure include a compensation device for adjusting the luminous intensity distribution of the second light, such that, by changing the luminous intensity distribution of the second light, the luminous intensity distribution of the second light exiting from the compensation device is substantially the same as that of the laser light. Therefore, the luminous intensity distributions of the first light and the second light in the third light obtained by combining the excited light and the second light are substantially the same so that the color distribution of the light beam formed by the third light is uniform.

Symbol description of main components

| | |
|---|---|
| light source system | 100, 600 |
| light-emitting module | 110, 610 |
| light splitting and combining device | 120, 620 |
| first collection lens group | 130, 630 |
| wavelength conversion device | 140, 240, 340, 440, 640 |
| fluorescent layer | 241, 341, 441 |
| reflective layer | 243, 343, 443 |
| welding layer | 244 |
| substrate | 245 |
| compensation device | 150, 650 |
| compensation element | 151, 651 |
| second collection lens group | 152, 652 |
| scattering element | 153, 653 |
| relay lens | 160 |
| first light path | L1 |
| second light path | L2 |

The present disclosure will be further illustrated by following specific embodiments with reference to the above drawings.

DESCRIPTION OF EMBODIMENTS

Figure 1:
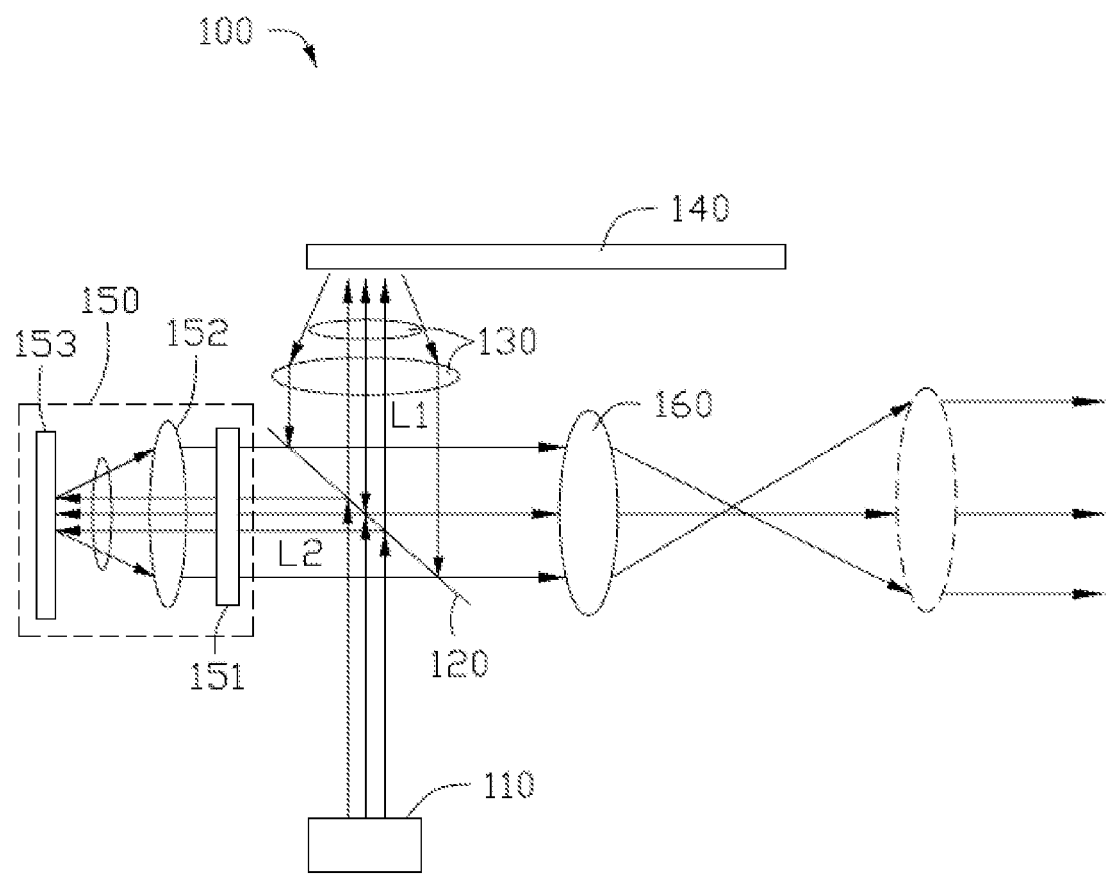
FIG. 1 is a structural schematic diagram of a light source system according to an embodiment of the present disclosure.

Referring to FIG. 1, it is a structural schematic diagram of a light source system 100 according to an embodiment of the present disclosure. The light source system 100 can be applied to a lighting apparatus, especially devices such as stage lights or searchlights. The light source system 100 includes a light-emitting module 110, a light splitting and combining device 120, a first collection lens group 130, a wavelength conversion device 140, a compensation device 150, and a relay lens 160. The light-emitting module 110 is configured to emit excitation light. The light splitting and combining device 120 is configured to split the excitation light into first light emitted along a first light path L1 and second light emitted along a second light path L2. The wavelength conversion device 140 is configured to receive the first light and perform wavelength conversion of the first light, which emits excited light with a color different from that of the first light. The first collection lens group 130 is disposed on the first light path L1 between the light splitting and combining device 120 and the wavelength conversion device 140, which is at least configured to converge a light beam emitted from the light splitting and combining device 120 to the wavelength conversion device 140. After being emitted from the light splitting and combining device 120, the first light is sequentially converged to the wavelength conversion device 140 by the first collection lens group 130, after which the wavelength conversion device 140 generates and reflects the excited light, and the excited light in a form of Lambertian light is collimated by the first collection lens group 130 and then incident to the light splitting and combining device 120. The compensation device 150 is configured to guide the second light and adjust a luminous intensity distribution of the second light in such a manner that a luminous intensity distribution of the second light emitted from the compensation device 150 is substantially the same as that of the excited light. The light splitting and combining device 120 is further configured to combine the excited light and the second light exiting from the compensation device 150 to form third light to be emitted from the light source system 100. In the third light, luminous intensity distribution proportions of the first light and the second light are substantially the same so that the third light is a light beam with a uniform color.

A luminous intensity is referred to as a light intensity for short, and it is a luminous flux within a unit solid angle along a direction of a light path and can be measured with a device such as a light meter. The expression of "luminous intensity distribution is substantially the same" in the present disclosure means that a distribution of a luminous intensity magnitude within a solid angle of a light beam is substantially the same, or it can be equivalent to that a surface distribution of the luminous intensity on a cross-section of the light beam is substantially the same, and it can also be equivalent to that an illuminance distribution on a given cross-section of a light beam is substantially the same. Luminous intensity distributions of two light beams being substantially the same doesn't require light-emitting intensities of the two light beams to be equal, as long as the light-emitting intensities of the two light beams at corresponding positions are in a proportional relationship.

For example, there are a light beam 1 and a light beam 2. The light beam 1 includes a region A and a region B that are optional, and the light beam 2 includes a region A 'and a region B'. The region A'(B') of the light beam 2 corresponds to the region A(B) of the light beam 1. If a ratio of a luminous intensity of the region A to a luminous intensity of the region B is a:b, whereas a ratio of a luminous intensity of the region A' to a luminous intensity of the region B' is also a:b, then it is considered that a luminous intensity distribution of the light beam 1 is the same as that of the light beam 2. "The region A'(B') of the light beam 2 corresponds to the region A(B) of the light beam 1" means that the region A'(B') of the light beam 2 exactly coincides with the region A(B) of the light beam 1 after the light beam 1 and the light beam 2 are combined.

The "substantially the same" in the present disclosure means being the same within an error range. For example, it is assumed that when a ratio of a total luminous intensity of the second light exiting from the compensation device at a position for combing lights and following positions on a light path to that of a total luminous intensity of the excited light is x, a ratio of the luminous intensity of the second light finally emitted from the compensation device at any position of a cross section of the light beam to the luminous intensity of the excited light at a corresponding position is in a range of 0.8x to 1.2x. In an embodiment of the present disclosure, the ratio of the luminous intensity of the second light finally emitted from the compensation device at any position of a cross section of the light beam to the luminous intensity of the excited light at the corresponding position is in a range of 0.9x to 1.1x. In another embodiment of the present disclosure, the ratio of the luminous intensity of the second light finally emitted from the compensation device at any position of a cross section of the light beam to the luminous intensity of the excited light at the corresponding position is in a range of 0.95x to 1.05x, and within this range, the third light emitted from the light source system appears to be light of a uniform color within a perceivable range of human eyes. It can be understood that in the most ideal case, the ratio of the luminous intensity of the second light finally emitted from the compensation device at any position of a cross section of the light beam to the luminous intensity of the excited light at the corresponding position is always x, making the color of the third light absolutely uniform and single. However, it is difficult for an actual error accuracy to achieve that, and the ratio can only be close to x.

In this embodiment, the light-emitting module 110 may be a blue light source, which is configured to emit blue laser light. It can be understood that the light-emitting module 110 is not limited to the blue light source, and in other embodiments of the present disclosure, the light-emitting module 110 may also be an ultraviolet light source, a violet light source, a red light source, a green light source, or the like. In this embodiment, an illuminant in the light-emitting module 110 is a blue laser (such as a blue laser diode) for emitting blue laser light as excitation light. It can be understood that the illuminant may include one, two or more laser arrays. Since stage lights require a high emission light power, there are many laser arrays in actual use, and the number of the lasers can be selected according to actual needs.

The excitation light is laser light, the luminous intensity is in a Gaussian distribution, a luminous intensity is relatively large and a brightness is relatively high near a center of a light spot, and a luminous intensity is relatively small and the brightness is relatively low at an edge region of the light spot. It can be understood that the excitation light may also be light emitted from a high-brightness LED, but it still needs to satisfy characteristics of an approximate Gaussian distribution in the light distribution.

In this embodiment, the light-emitting module 110 is an entire integrated light source module, and may split light into the first light and the second light by the light splitting and combining device 120. Specifically, the excitation light emitted from the light-emitting module 110 is incident to the light splitting and combining device 120 along the same light path and is split into two light beams. Such light splitting process may be light splitting based on polarization states (which requires the light-emitting module 110 to emit light of at least two polarization states), it can also be light splitting based on wavelengths (which requires the light-emitting module 110 to emit light of at least two wavelengths), and it may also be light splitting based on refraction and reflection characteristics of the excitation light by a dielectric interface.

Figure 5:
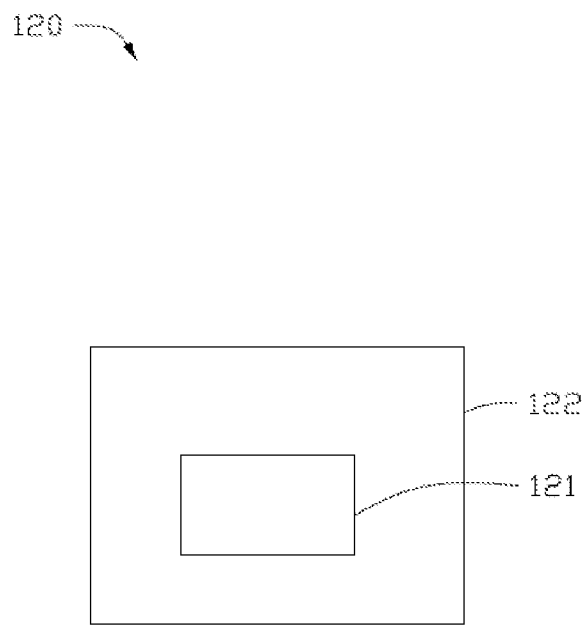
FIG. 5 is a structural schematic diagram of a light splitting and combining device shown in FIG. 1.

FIG. 5 is a structural schematic diagram of the light splitting and combining device 120 shown in FIG. 1. With continued reference to FIG. 5 in conjunction with FIG. 1, the light splitting and combining device 120 guides the excitation light emitted from the light-emitting module 110 and splits the excitation light into the first light transmitted along the first light path L 1 and the second light transmitted along the second light path L2. The light splitting and combining device 120 includes a first region 121 and a second region 122. In this embodiment, the first region 121 is located in a central region of the light splitting and combining device 120, and is configured to transmit a part of the excitation light to obtain the first light transmitted along the first light path L1 and is further configured to reflect the excited light; and the second region 122 is disposed around an outer edge of the first region 121, and is configured to reflect the other part of the excitation light to obtain the second light transmitted along the second light path L2 and is further configured to reflect the excited light.

In one embodiment, the first region 121 on the light splitting and combining device 120 is a part of a region irradiated by the excitation light. The first region 121 is provided with a blue-transmitting and yellow-reflecting dichroic film for transmitting the blue excitation light and reflecting the excited light (such as red, green or yellow), and the second region is provided with a blue-reflecting and yellow-reflecting dichroic film for reflecting the blue excitation light and the excited light (such as red, green or yellow).

In one embodiment, the first region 121 of the light splitting and combining device 120 is a region irradiated by the excitation light, and the first region 121 is provided with a transparent dielectric sheet. The dielectric sheet refracts a part of the incident excitation light, the refracted excitation light is emitted from the dielectric sheet to form the first light transmitted along the first light path L1, and the dielectric sheet also reflects the other part of the excitation light to obtain the second light transmitted along the second light path L2. The dielectric sheet may be a transparent glass sheet. The second region 122 is provided with a reflective film or a blue-transmitting and yellow-reflecting dichroic film for reflecting the excited light.

In one embodiment, the excitation light includes excitation light in a first polarization state and excitation light in a second polarization state. Correspondingly, the light-emitting module 110 is provided with two groups of illuminants, in which one group of the illuminants emit the excitation light in the first polarization state, and the other group of the illuminants emit the excitation light in the second polarization state.

The first region 121 of the light splitting and combining device 120 is the region irradiated by the excitation light. The first region 121 is provided with a polarizer, which utilizes the different polarization states of the excitation light to perform light splitting. The polarizer transmits the excitation light in the first polarization state to obtain the first light and reflects the excitation light in the second polarization state to obtain the second light.

In other embodiments, the light splitting and combining device 120 may be a wavelength light-splitting polarizer so that there is no need for regional processing on the light splitting and combining device 120. The wavelength light-splitting polarizer has characteristics of both wavelength light-splitting and polarization light-splitting. Specifically, the wavelength light-splitting polarizer transmits the blue excitation light in the first polarization state and reflects the yellow excited light and the blue excitation light in the second polarization state.

It can be understood that, in other embodiments of the present disclosure, the light-emitting module may also be a combination of two relatively independent light-emitting units, one of which is configured to emit the first light and the other is configured to emit the second light. In this embodiment, a light splitting function of the light splitting and combining device may not be indispensable, and the light splitting and combining device is only used for combining the second light emitted from the compensation device with the excited light. Even in another modified embodiment, the light splitting and combining device is not indispensable, and the light splitting and combining device is omitted in the light source system. Specifically, the light-emitting module includes at least two light-emitting units, first light emitted from a first light-emitting unit impinges the wavelength conversion device along the first light path, and second light emitted from a second light-emitting unit impinges the compensation device along the second light path, and then the excited light emitted from the wavelength conversion device and the second light emitted from the compensation device are combined to obtain third light.

The wavelength conversion device 140 is comprises a wavelength conversion material, which is used for performing wavelength conversion on the first light. In this embodiment, the wavelength conversion device 140 is a fixed reflective yellow phosphor sheet, where yellow phosphors of the wavelength conversion material are uniformly distributed. The blue first light irradiates the phosphor sheet to excite the yellow phosphors to generate yellow fluorescent light in form of Lambertian light, which is also referred to yellow excited light.

In one embodiment, the wavelength conversion device 140 is a fluorescent color wheel that periodically rotates under driving of a driving unit, and the color wheel rotates at a high speed with the driving unit as an axis center, thereby preventing heat from being accumulated at the same position of the wavelength conversion material. The fluorescent color wheel may be a single-color fluorescent color wheel.

In one embodiment, the color wheel includes at least a first section and a second section. The first section is provided with red phosphors or yellow phosphors, and the second section is provided with green phosphors. It can be understood that in other embodiments, the fluorescent color wheel may be provided with more than two segmented regions to generate excited light with more than two colors, or the fluorescent color wheel may be provided with phosphors of other colors to generate excited light of other colors.

As the luminous intensity of the light beam incident to the wavelength conversion device increases, the luminous intensity of the excited light emitted from the wavelength conversion material gradually increases, and the heat generated by the wavelength conversion material gradually increases. However, when the incident light beam reaches a certain luminous intensity, it is difficult for the heat generated by the wavelength conversion material to be dissipated effectively, which rises temperature to affect activity and stability of the wavelength conversion material so that a light conversion efficiency of the wavelength conversion material decreases.

In the application scenario of the present disclosure, since the first light incident to the wavelength conversion device 140 has a relatively large luminous intensity near its center and has a relatively small luminous intensity at its edge position, the light conversion efficiency at the center of the wavelength conversion device 140 is relatively low, while the light conversion efficiency at the edge is relatively high, which results different proportions of the luminous intensity distributions of the excited light emitted from the wavelength conversion device 140 and the first light incident to the wavelength conversion device 140. Specifically, relative to the luminous intensity distribution of the first light, the excited light has a relatively low brightness near its center and has a relatively high brightness at its edge region. If the excited light is directly combined with the second light of which the light distribution is not adjusted by the compensation device, a light spot/light beam with a high color temperature at a center and a low color temperature at an edge will be obtained.

In order to obtain a light spot/light beam having a uniform color in the present disclosure, the compensation device 150 is provided on the light path of the second light to adjust the luminous intensity distribution of the second light.

As shown in FIG. 1, the compensation device 150 includes a compensation element 151, a second collection lens group 152, and a scattering element 153.

The compensation element 151 is configured to adjust the luminous intensity distribution of the incident second light. Compared with the incident light beam, an overall luminous intensity of an emergent light beam of the compensation element 151 is lowered (since there will inevitably be loss when the light passes through optical elements), and an attenuation of the luminous intensity in a position in the emergent light beam of the compensation element 151 increases as a distance to the central position decreases.

Specifically, in one embodiment, the compensation element 151 includes an angle diffuser for diffusing a central part of the second light to the edge part of the incident light beam. In this embodiment, the luminous intensity at the center of the light beam decreases, while the luminous intensity at the edge of the light beam increases, which also belongs to the case in which "an attenuation of the luminous intensity in a position in the emergent light beam of the compensation element 151 increases as a distance to the central position", except that a value by which the luminous intensity decreases at the edge position is negative. In one embodiment, the compensation element 151 includes a filter which is coated with a gradually changing metal film and has an absorption rate for a light beam that gradually decreases from a center to an edge of the filter. In one embodiment, the compensation element 151 includes a dielectric film with a gradually changing transmittance and has a transmittance for a light beam that gradually increases from a center to an edge of the filter.

The scattering element 153 is configured to scatter and de-coherent the second light so that it can reduce a possibility of laser speckle and improve light emission uniformity of the second light. The scattering element 153 may scatter the second light without changing its luminous intensity distribution. In this embodiment, the scattering element 153 may be a reflective scattering powder sheet.

The second collection lens group 152 is disposed on the second light path L2 between the compensation element 151 and the scattering element 153. The second light emitted from the compensation element 151 is sequentially converged by the second collection lens group 152, scattered and then reflected by the scattering element 153, and collimated by the second collection lens group 152 to be impinged by the compensation element 151 again.

In the compensation device 150, the compensation element 151 adjusts the optical power distribution of the second light twice in such a manner that an attenuation of the optical power near the center is larger, thereby allowing the luminous intensity distribution of the second light emitted from the compensation device 150 to be substantially the same as that of the excited light.

In addition, the first collection lens group 130 and the second collection lens group 152 adjust a light beam diameter of the excited light and a light beam diameter of the second light that is emitted from the compensation device 150, respectively so that light spots formed by the excited light and the second light irradiating the light splitting and combining device 120 completely coincide. Therefore, the excited light and the second light, which have the same light spot size and substantially the same luminous intensity distribution, are combined on the light splitting and combining device 120 to obtain the third light emitted from the light source device. Proportions of the luminous intensity distributions of light with different colors (the blue second light and the yellow excited light) in the third light are substantially the same, and the light spot of the third light has a uniform color. In one embodiment, color coordinates of any position on the light spot formed by the third light are in a same seventh-order Mac Adam ellipse. In another embodiment, the color coordinates of any position on the light spot formed by the third light are located at a same fourth-order Mac Adam ellipse, and such technical solution can fully meet people's requirements for light colors in lighting.

In this embodiment, although the second light emitted from the compensation device reduces the luminous intensity at its center, the light conversion efficiency at the center of the wavelength conversion device is also lower than that at the edge, but the third light is still a light beam in an approximate Gaussian distribution, which has a bright center and a dark edge.

The third light is emitted from a light emission exit of the light source system 100 after passing through the relay lens 160. In this embodiment, the relay lens 160 is a convex lens. In other embodiments, the relay lens 160 may be a series of lens groups. Without doubt, the relay lens is not indispensable, and the relay lens can also be omitted in the light source system.

Figure 6:
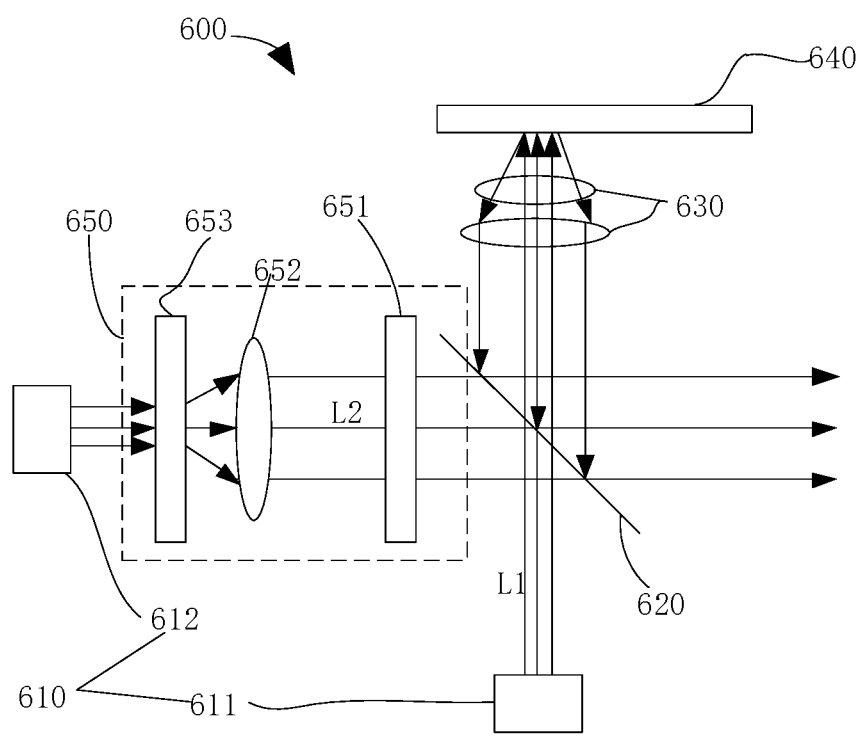
FIG. 6 is a structural schematic diagram of a light source system according to a modified embodiment of the present disclosure.

Referring to FIG. 6, which is a structural schematic diagram of a light source system according to a modified embodiment of the present disclosure, the light source system 600 includes a light-emitting module 610, a light splitting and combining device 620, a first collection lens group 630, a wavelength conversion device 640, and a compensation device 650. The light-emitting module 610 includes a first light-emitting unit 611 and a second light-emitting unit 612 that are independent, the first light-emitting unit 611 emits first light along the first light path L1, and the second light-emitting unit 612 emits second light along the second light path L2. The wavelength conversion device 640 is configured to receive the first light and perform wavelength conversion on the first light to emit excited light with a different color from that of the first light. The first collection lens group 630 is disposed on the first light path L1 between the light splitting and combining device 620 and the wavelength conversion device 640, which is at least configured to converge a light beam emitted from the light splitting and combining device 620 to the wavelength conversion device 640. The compensation device 650 is configured to guide the second light and adjust a luminous intensity distribution of the second light so that the luminous intensity distribution of the second light emitted from the compensation device 650 is substantially the same as that of the excited light. The light splitting and combining device 620 is configured to combine the excited light and the second light emitted from the compensation device 650 to generate third light to be emitted from the light source system 600. In the third light, proportions of the luminous intensity distributions of the first light and the second light are substantially the same so that the third light is a light beam of a uniform color.

Main differences between this embodiment and the embodiment shown in FIG. 1 will be described as follows.

The light-emitting module in this embodiment includes two relatively independent light-emitting units, which are emitting the first light and the second light independently, respectively. Therefore, properties of the first light and the second light can be more conveniently set in such a manner that they are different in terms of e.g., polarization states or wavelengths.

The compensation device 650 of this embodiment includes a scattering element 653, a second collection lens group 652, and a compensation element 651. The second light emitted from the second light-emitting unit 612 is scattered and de-coherent by the scattering element 653 and transmitted, and then reaches the compensation element 651 after being collimated by the second collection lens group 652. This embodiment uses transmission instead of reflection, such that it is easier to control the light distribution, and technical complexity of double actions of the compensation element can be avoided, but structure compactness of the embodiment of FIG. 1 is sacrificed. Similar to the case of the embodiment of FIG. 1 in which the second collection lens group 152 is not indispensable, the second collection lens group 652 in this embodiment is not indispensable either. In one embodiment, the compensation element may also be arranged on the light path before the scattering element.

Figure 2:
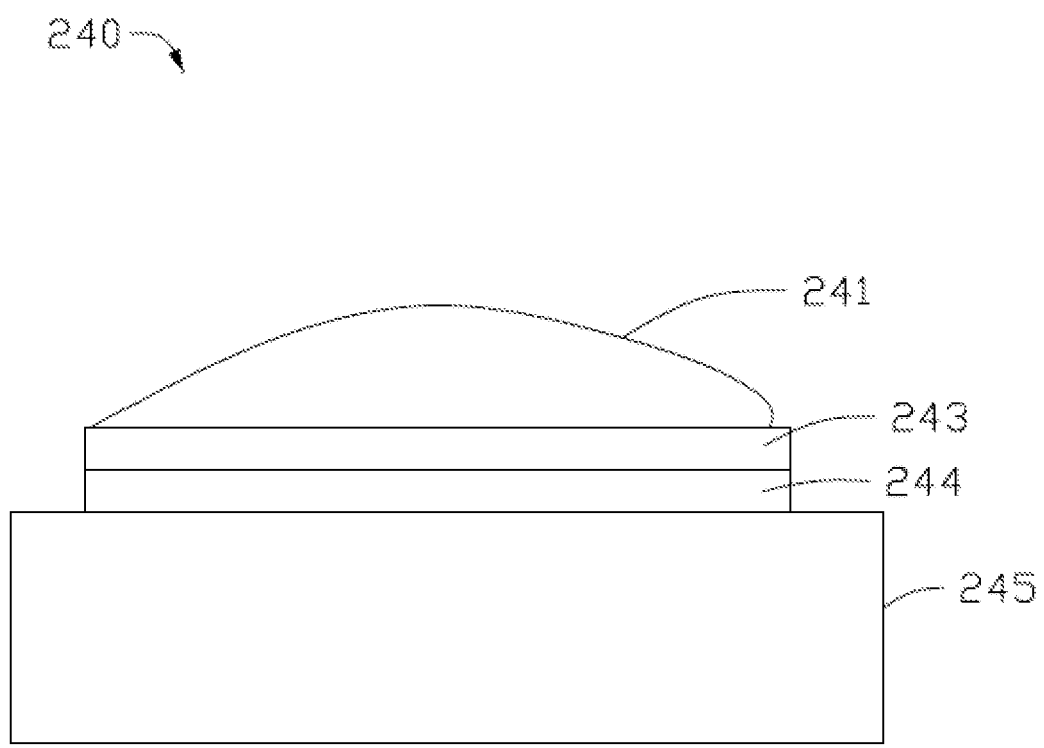
FIG. 2 is a structural schematic diagram of a second embodiment of a wavelength conversion device shown in FIG. 1.

In conjunction with FIG. 1 and with continued reference to FIG. 2, which is a structural schematic diagram of a second embodiment of the wavelength conversion device 240 shown in FIG. 1, the wavelength conversion device 240 includes a fluorescent layer 241, a reflective layer 243, a welding layer 244, and a substrate 245, which are sequentially stacked.

A material of the reflective layer 243 includes metal, which may be silver, gold or platinum. The welding layer 244 is configured to fix the reflective layer 243 with metal onto the substrate 245. The welding layer 244 includes a welding material such as solder, canister, or silver. The substrate 245 includes a highly thermally conductive metal material, such as copper or aluminum. In other embodiments, the reflective layer may also be a diffuse reflective layer containing white scattering particles, such as an aluminum oxide reflective layer, an aluminum nitride reflective layer or the like. The welding layer may be not indispensable. The substrate may also be a highly thermally conductive substrate such as sapphire or aluminum nitride ceramic.

In this embodiment, the fluorescent layer 241 is comprises phosphors for performing wavelength conversion on the incident first light and generating the excited light. A thickness of the fluorescent layer 241 decreases from the center to the edge. The fluorescent layer 241 includes a flat surface and a curved surface that are opposite to each other, and the fluorescent layer 241 is in contact with the reflective layer 243 through the flat surface.

When the first light irradiates the fluorescent layer 241, the luminous intensity of the first light is in a Gaussian distribution, the near-center light beam with a high luminous intensity irradiates a central region of the fluorescent layer 241 having a relatively large thickness, and the edge light beam with a low luminous intensity irradiates an adjacent edge region of the fluorescent layer 241 having a relatively small thickness. Since the central region, in which the luminous intensity of the incident light is high, has a strong photoluminescence effect, it generates more heat, and the light conversion efficiency of the central region decreases under an affection of the heat. While the edge region, in which the luminous intensity of the incident light is low, has a weak photoluminescence effect, it generates less heat, and the light conversion efficiency of the edge region is relatively high. This embodiment reduces, by configuring the fluorescent layer to have a thick center and a thin edge, a total amount of the excited light generated by the fluorescent layer at the edge region, such that even if the light conversion efficiency at the edge region is relatively high, there will not be excessive excited light at the edge region. This technical solution can relief, from the source, the problem of color non-uniformity of the light emitted from the wavelength conversion device.

In an additional technical solution of the present disclosure, emitted light with a uniform color can be obtained without relying on the compensation devices of FIGS. 1 and 6. This technical solution, by improving the wavelength conversion device shown in FIG. 2, adjusts thicknesses of the fluorescent layer of the wavelength conversion device at different regions, in such a manner that the wavelength conversion device directly emits the excited light and the unabsorbed excitation light, thereby obtaining illumination light with a uniform color.

Specifically, the technical solution includes: a light-emitting module configured to emit excitation light, and a wavelength conversion device configured to receive the excitation light and convert a part of the excitation light to excited light with a color different from that of the excitation light. The excited light and a part of the excitation light that is not absorbed by the wavelength conversion device are emitted together as emergent light of the wavelength conversion device, to form light to be emitted from the light source system.

In this technical solution, the wavelength conversion device includes a fluorescent layer, a reflective layer and a substrate stacked in sequence, and the thickness of the fluorescent layer is characterized by a thick center and a thin edge, corresponding to that the incident excitation light has a high luminous intensity at the center and a low luminous intensity at the edge. The center of the fluorescent layer has a low luminous efficiency due to a strong photoluminescence effect and a high temperature, and the emitted excited light is reduced. While the edge of the fluorescent layer has a high luminous efficiency due to a weak photoluminescence effect and a low temperature, but there is more excitation light left due to its thin thickness. Under an effect of such trade-off, proportions of the excitation light and the excited light at the center and the edge of the fluorescent layer can be kept substantially the same (for example, floating at 5% above and below an average proportion), thereby resulting in the uniform color for the combined emitted light.

Figure 3:
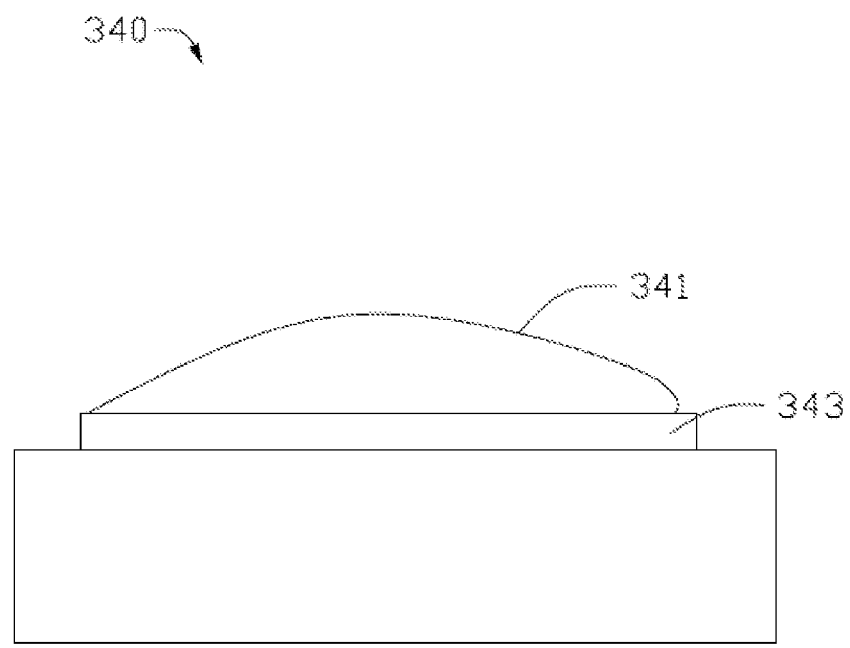
FIG. 3 is a structural schematic diagram of a third embodiment of a wavelength conversion device shown in FIG. 1.

Referring to FIG. 3, which is a structural schematic diagram of a third embodiment of the wavelength conversion device 340 shown in FIG. 1, the wavelength conversion device 340 provided in this embodiment differs from the wavelength conversion device 240 in that the reflective layer 343 in the wavelength conversion device 340 may be a sintered layer of white scattering particles and glass frit and the welding layer 244 is omitted, thereby reducing a volume of the wavelength conversion device 340. The other structures are the same as those of the wavelength conversion device 240 and will not be described in detail.

Figure 4:
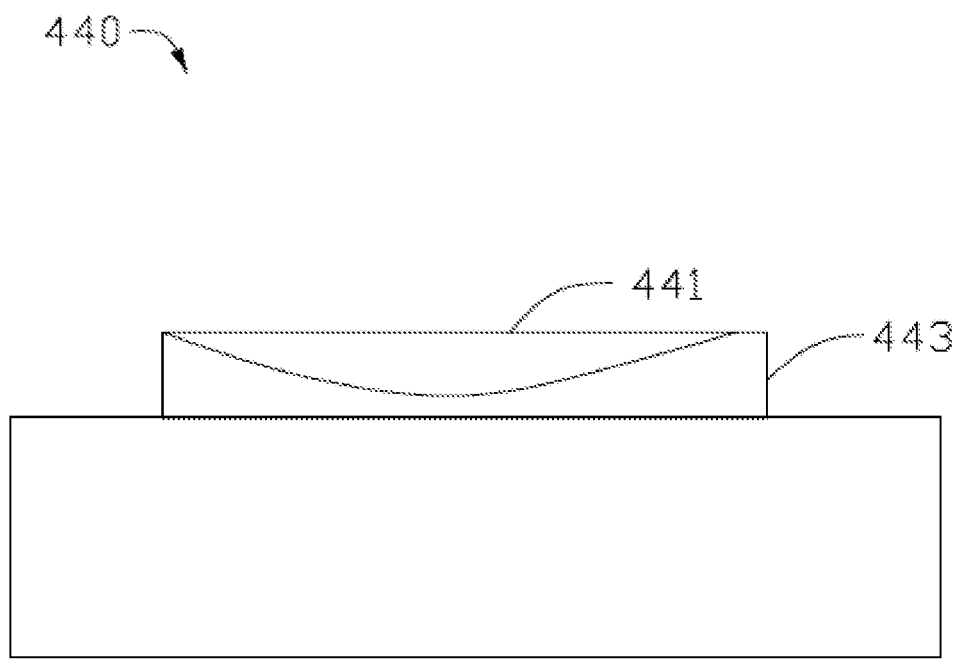
FIG. 4 is a structural schematic diagram of a fourth embodiment of a wavelength conversion device shown in FIG. 1.

Referring to FIG. 4, which is a structural schematic diagram of a fourth embodiment of the wavelength conversion device 140 shown in FIG. 1, the wavelength conversion device 440 provided in this embodiment differs from the wavelength conversion device 340 in that the fluorescent layer is in contact with the reflective layer 443 through a curved surface of the fluorescent layer 441, which further reduces the volume of the wavelength conversion device 440. The other structures are the same and will not be repeated here. The technical solution of the wavelength conversion device of FIG. 4 can also be independently applied to the "additional technical solution" in the above paragraph. In addition to using the thickness of the fluorescent layer to adjust the luminous intensity distribution of the excited light, this technical solution further uses a thickness of the reflective layer to perform adjustment. Specifically, since a thermal conduction performance of the reflective layer is generally poor, it is more difficult to dissipate heat at a position at the thicker reflective layer, which in turn leads to a decrease in the luminous efficiency of the fluorescent layer in this region. Therefore, by configuring the reflective layer to have a thin center and a thick edge, the thickness of the edge region of the reflective layer is increased, and the luminous efficiency of the fluorescent layer at the edge position is reduced, such that the luminous efficiency of the center of the fluorescent layer is closer to the luminous efficiency of the edge region of the fluorescent layer, thereby reducing the luminous intensity of the emitted excited light at the edge position and thus finally achieving an effect of a uniform color of the combined light exiting light.

The light source system of the present disclosure is mainly applied to a lighting apparatus, such as stage lights, searchlights, etc. Compared with a light source in a projection display apparatus, the light source system of the present disclosure has different requirements for an output light beam. The light source system of the present disclosure allows light beams/light spots having a non-uniform brightness distribution to be emitted. Generally, the light emitted from the light source system is desired to be radiated as far as possible under the same power (which can be considered as an electric power of the light source system), so a power density distribution of the light beam is generally in a Gaussian distribution. That is, the luminous intensity in the center of the light beam is large, while the luminous intensity at the edge of the light beam is relatively small so that energy can be concentrated as much as possible, so as to illuminate as far as possible. Different from this, it is generally desired for the illumination light source in the projection display apparatus that the luminous intensity distribution of the light beam is uniform so that a uniform light spot can be modulated into an image by a light modulator. For image display, a light beam having a non-uniformly distributed luminous intensity will be distorted after being modulated into an image. Therefore, the light source system of the present disclosure cannot be compared or replaced with a light source module applied to a projection display system, and these two have significant application environment differences.

In order to solve the technical problem of color non-uniformity of the light spot of the stage lights in the related art, the present disclosure provides a light source system, including: a light-emitting module configured to emit first light along a first light path and second light along a second light path; a wavelength conversion device configured to receive the first light and emit excited light with a color different from that of the first light; and a compensation device configured to guide the second light and adjust a luminous intensity distribution of the second light so that the second light exiting from the compensation device is substantially identical to that of the excited light. The second light exiting from the compensation device is combined with the excited light to form third light to be the light source system.

In an embodiment, when a ratio of a total luminous intensity of the second light exiting from the compensation device at a position for combing lights and following position on a light path to that of a total luminous intensity of the excited light is x, a ratio of a luminous intensity of the second light exiting from the compensation device at any position of a cross section of a light beam to a luminous intensity of the excited light at a corresponding position is in a range of 0.8x to 1.2x.

In an embodiment, the compensation device includes a compensation element configured to adjust a luminous intensity distribution of a light beam so that an emergent light beam of the compensation element has a reduced overall luminous intensity compared with an incident light beam of the compensation element. And an attenuation of the luminous intensity at a position in the emergent light beam of the compensation element increases as a distance from the position to a center position of the light beam decreases.

In an embodiment, the compensation element includes at least one of an angle diffuser configured to diffuse a central part of the incident light beam to an edge part of the incident light beam, a filter which is coated with a gradually changing metal absorption film and has an absorption rate for a light beam that gradually decreases from a center to an edge of the filter, and a filter coated with a dielectric film with a gradually changing transmittance that gradually increases from a center to an edge of the filter.

In an embodiment, the compensation device further includes a scattering element configured to de-coherent the second light.

In an embodiment, the compensation device further comprises a second collection lens group on the second light path between the compensation element and the scattering element, wherein the second light sequentially passes through the compensation element and the second collection lens group and then is converged to the scattering element which in turn scatters and reflects the second light to the second collection lens group, and the second light is then emitted from the compensation element after being collimated through the second collection lens group.

In an embodiment, the wavelength conversion device includes a fluorescent layer, a reflective layer, and a substrate, which are sequentially stacked, and a thickness of the fluorescent layer decreases from its center to its edge.

In an embodiment, the fluorescent layer includes a flat surface and a curved surface, which are opposite to each other, and the fluorescent layer is in contact with the reflective layer through the flat surface or the curved surface.

In an embodiment, the light source system further includes a light splitting and combining device configured to split light emitted from the light-emitting module into the first light emitted along the first light path and the second light emitted along the second light path, and guide the first light to impinge the wavelength conversion device and the second light to impinge the compensation device, wherein the light splitting and combining device is further configured to combine the excited light with the second light exiting from the compensation device so as to emit the third light.

In an embodiment, the light source system further includes a first collection lens group, which is disposed on the first light path adjacent to the wavelength conversion device, and configured to adjust a light spot diameter of the excited light emitted from the wavelength conversion device in such a manner that light spots of the excited light and the second light exiting from the compensation device completely coincide when the excited light is combined with the second light exiting from the compensation device.

In an embodiment, the light-emitting module is a combination of two relatively independent light-emitting units, one of which is configured to emit the first light and the other is configured to emit the second light. The above are only embodiments of the present disclosure and do not limit the patent scope of the present disclosure. Any equivalent structure or equivalent process transformation made according to the description and drawings of the present disclosure, or those directly or indirectly used in other related technical fields, are all included in the patent protection scope of the present disclosure.

What is claimed is:

1. A light source system, comprising:
a light-emitting module configured to emit first light along a first light path and second light along a second light path;
a wavelength conversion device configured to receive the first light and emit excited light with a color different from that of the first light; and
a compensation device configured to guide the second light and adjust a luminous intensity distribution of the second light so that the luminous intensity distribution of the second light exiting from the compensation device is substantially identical to that of the excited light,
wherein the second light exiting from the compensation device is combined with the excited light to form third light to be emitted from the light source system; and
wherein when a ratio of a total luminous intensity of the second light exiting from the compensation device at a position for combining lights and following positions on a light path to that of a total luminous intensity of the excited light is x, a ratio of a luminous intensity of the second light exiting from the compensation device at any position of a cross section of a light beam to a luminous intensity of the excited light at a corresponding position is in a range of 0.8x to 1.2x.

2. The light source system according to claim 1, wherein the compensation device comprises a compensation element configured to adjust a luminous intensity distribution of a light beam so that an emergent light beam of the compensation element has a reduced overall luminous intensity compared with an incident light beam of the compensation element, wherein an attenuation of the luminous intensity at a position in the emergent light beam of the compensation element increases as a distance from the position to a center position of the light beam decreases.

3. The light source system according to claim 1, wherein the compensation device comprises a compensation element configured to adjust a luminous intensity distribution of a light beam, and the compensation element comprises at least one of
an angle diffuser configured to diffuse a central part of the incident light beam to an edge part of the incident light beam;
a filter which is coated with a gradually changing metal absorption film and has an absorption rate for a light beam that gradually decreases from a center to an edge of the filter; and
a filter which is coated with a dielectric film with a gradually changing transmittance and has a transmittance for a light beam that gradually increases from a center to an edge of the filter.

4. The light source system according to claim 1, wherein the compensation device comprises a compensation element configured to adjust a luminous intensity distribution of a light beam, and a scattering element configured to de-coherent the second light.

5. The light source system according to claim 4, wherein the compensation device further comprises a second collection lens group on the second light path between the compensation element and the scattering element, wherein the second light sequentially passes through the compensation element and the second collection lens group and then is converged to the scattering element which in turn scatters and reflects the second light to the second collection lens group, and the second light is then emitted from the compensation element after being collimated through the second collection lens group.

6. A light source system, comprising:
a light-emitting module configured to emit first light along a first light path and second light along a second light path;
a wavelength conversion device configured to receive the first light and emit excited light with a color different from that of the first light; and
a compensation device configured to guide the second light and adjust a luminous intensity distribution of the second light so that the luminous intensity distribution of the second light exiting from the compensation device is substantially identical to that of the excited light,
wherein the second light exiting from the compensation device is combined with the excited light to form third light to be emitted from the light source system, and
wherein the wavelength conversion device comprises a fluorescent layer, a reflective layer, and a substrate, which are sequentially stacked, wherein a thickness of the fluorescent layer decreases from its center to its edge.

7. The light source system according to claim 6, wherein the fluorescent layer comprises a flat surface and a curved surface which are opposite to each other, and the fluorescent layer is in contact with the reflective layer at the flat surface or the curved surface.

8. The light source system according to claim 1, further comprising a light splitting and combining device configured to split light emitted from the light-emitting module into the first light emitted along the first light path and the second light emitted along the second light path, and guide the first light to impinge the wavelength conversion device and the second light to impinge the compensation device, wherein the light splitting and combining device is further configured to combine the excited light with the second light exiting from the compensation device so as to emit the third light.

9. The light source system according to claim 1, further comprising a first collection lens group which is disposed on the first light path adjacent to the wavelength conversion device and configured to adjust a light spot diameter of the excited light emitted from the wavelength conversion device in such a manner that light spots of the excited light and the second light exiting from the compensation device completely coincide when the excited light is combined with the second light exiting from the compensation device.

10. The light source system according to claim 1, wherein the light-emitting module is a combination of two independent light-emitting units, one of which is configured to emit the first light and the other is configured to emit the second light.

11. A lighting apparatus, comprising a light source system which comprises:
  a light-emitting module configured to emit first light along a first light path and second light along a second light path;
  a wavelength conversion device configured to receive the first light and emit excited light with a color different from that of the first light; and
  a compensation device configured to guide the second light and adjust a luminous intensity distribution of the second light so that the luminous intensity distribution of the second light exiting from the compensation device is substantially identical to that of the excited light,
  wherein the second light exiting from the compensation device is combined with the excited light to form third light to be emitted from the light source system; and
  wherein when a ratio of a total luminous intensity of the second light exiting from the compensation device at a position for combining lights and following positions on a light path to that of a total luminous intensity of the excited light is x, a ratio of a luminous intensity of the second light exiting from the compensation device at any position of a cross section of a light beam to a luminous intensity of the excited light at a corresponding position is in a range of 0.8x to 1.2x.

12. The lighting apparatus according to claim 11, wherein the compensation device comprises a compensation element configured to adjust a luminous intensity distribution of a light beam so that an emergent light beam of the compensation element has a reduced overall luminous intensity compared with an incident light beam of the compensation element, wherein an attenuation of the luminous intensity at a position in the emergent light beam of the compensation element increases as a distance from the position to a center position of the light beam decreases.

13. The lighting apparatus according to claim 11, wherein the compensation device comprises a compensation element configured to adjust a luminous intensity distribution of a light beam, a scattering element configured to de-coherent the second light, and a second collection lens group on the second light path between the compensation element and the scattering element, wherein the second light sequentially passes through the compensation element and the second collection lens group and then is converged to the scattering element which in turn scatters and reflects the second light to the second collection lens group, and the second light is then emitted from the compensation element after being collimated through the second collection lens group.

14. The lighting apparatus according to claim 11, wherein the wavelength conversion device comprises a fluorescent layer, a reflective layer, and a substrate, which are sequentially stacked, wherein a thickness of the fluorescent layer decreases from its center to its edge.

15. The lighting apparatus according to claim 11, further comprising a light splitting and combining device configured to split light emitted from the light-emitting module into the first light emitted along the first light path and the second light emitted along the second light path, and guide the first light to impinge the wavelength conversion device and the second light to impinge the compensation device, wherein the light splitting and combining device is further configured to combine the excited light with the second light exiting from the compensation device so as to emit the third light.

16. The lighting apparatus according to claim 11, further comprising a first collection lens group which is disposed on the first light path adjacent to the wavelength conversion device and configured to adjust a light spot diameter of the excited light emitted from the wavelength conversion device in such a manner that light spots of the excited light and the second light exiting from the compensation device completely coincide when the excited light is combined with the second light exiting from the compensation device.

17. The light source system according to claim 2, wherein the compensation element is configured to adjust the luminous intensity distribution of the second light twice.

18. The light source system according to claim 5, wherein the second collection lens group is configured to adjust a light beam diameter of the second light emitted from the compensation element.

* * * * *